Aug. 25, 1959      E. BURGER      2,900,888
PHOTOGRAPHIC LENS SHUTTER
Filed July 13, 1951      2 Sheets-Sheet 1
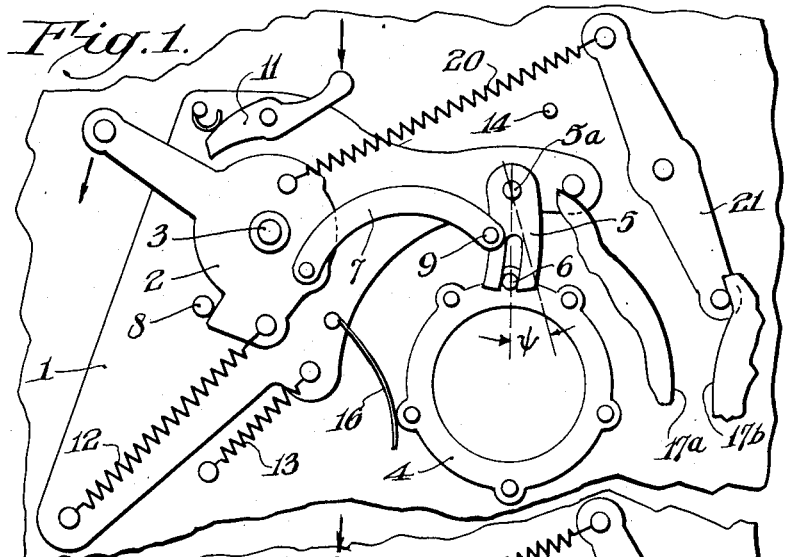
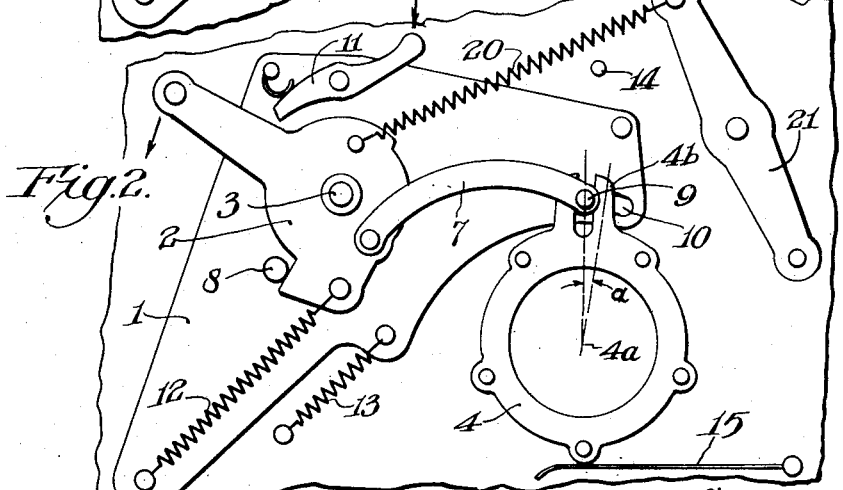
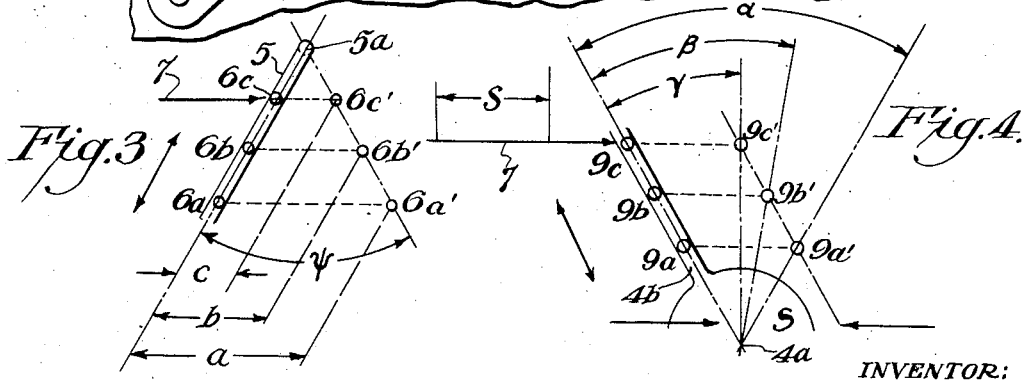
INVENTOR:
ERICH BURGER
BY
Connolly and Hutz
HIS ATTORNEYS

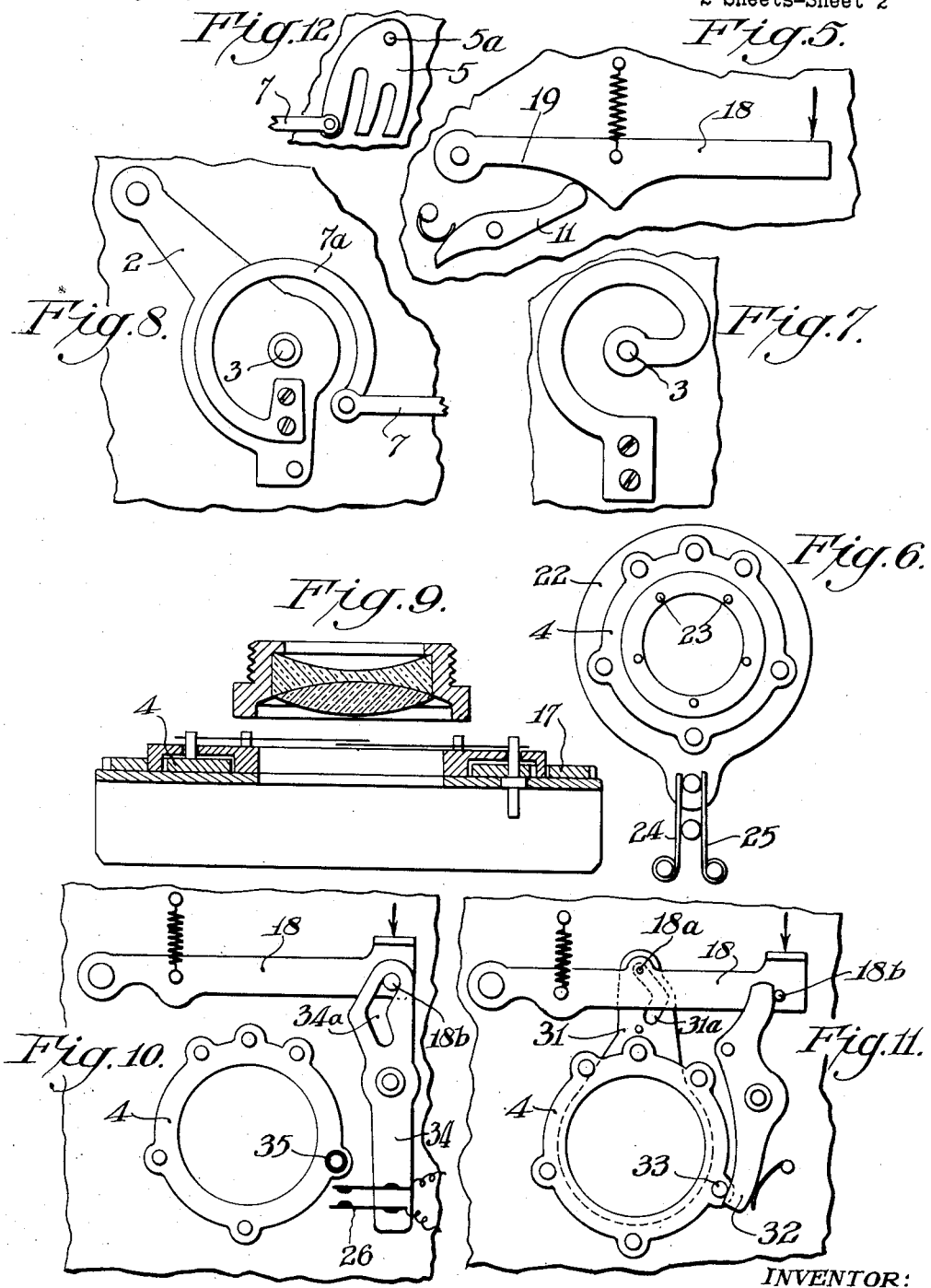

United States Patent Office 2,900,888
Patented Aug. 25, 1959

2,900,888
PHOTOGRAPHIC LENS SHUTTER
Erich Burger, Munich, Germany
Application July 13, 1951, Serial No. 236,484
9 Claims. (Cl. 95—63)

The present invention relates to a photographic lens shutter. More particularly, it concerns such a shutter having a plurality of sectors, that is capable of providing extremely short exposure times.

Heretofore, the shortest exposure time attainable by a photographic lens shutter was considered to be about $\frac{1}{500}$ of a second. Consequently, press and sport photographers are usually compelled to employ focal plane (slit) shutters, in order to satisfy all requirements.

Also technical exposures in many cases require extremely short exposure times. Such can no longer be attained by means of a normal lens shutter, so that it becomes necessary to operate with a focal plane shutter. However, focal plane shutters have the disadvantage that in most cases rapidly moving objects are distorted. Furthermore, the most modern flashlight equipment cannot be employed with focal plane shutters. The ever progressing state of the art makes it necessary to find ways and means to shorten still further the exposure times of lens shutters.

A lens shutter has been produced for some time, which has attained $\frac{1}{800}$ of a second as the shortest exposure time. However, the shortness of exposure attained by a focal plane shutter is thereby not nearly reached.

It has already been attempted to shorten the exposure time by means of freely swinging sectors. Also elastic members were built into the actuating system, in order to prevent injury to the sectors, as well as anvil-like projections for the sectors, from which they should be hurled back. However, the lower limit of the exposure time was soon reached. In one prior art device the shutter blades were opened beyond the normal opening in various degrees, in order to attain longer exposure times. Furthermore, it was known to use thrust curves having backs of various lengths. However, thereby one merely succeeded in delaying actuation of the member provided for making the opening, whereby the exposure time was shortened. In such cases the sectors were strongly stressed, and, furthermore, the shutter did not operate without vibration. Thus, the problem to be solved was to go beyond the shortest exposure time previously possible with lens shutters without endangering the sectors or their actuating means.

I have now solved this problem by my present invention, according to which the sectors are actuated in a motion reversing manner and are thereby opened to less than their full opening, and the actuating force, the masses of the driven parts and the resilience of the resilient member are so chosen, that the sectors, during the reversal of their direction of movement, give free the full opening of the shutter. It will be understood by the phrase "motion reversing manner" that the return or reclosing movement of the sectors, under conventional spring linkage power transmission means, is initiated prior to the obtaining of a fully opened aperture, or more accurately, prior to the termination of the opening movement of the sectors. The instant invention thus permits the sectors to continue to move in a shutter opening direction even though the control linkage is moving in a shutter closing direction. Thereby substantially shorter exposure times up to $\frac{1}{1600}$ of a second can be attained, and the shutter still operates free from vibration.

In order to attain various times of exposure, a lever mechanism is employed, whose transmission is variable. This can be accomplished, for example, by having the actuation of the sectors result by way of a lever that carries out a constant swinging movement and acts upon a member whose distance from the point of rotation of the lever is variable, so that the member is moved by the lever over paths of various lengths. A further possibility consists of having the actuation of the sectors result by way of a member that is moved backwardly and forwardly over a constant path and which acts upon a lever at a variable distance from its point of rotation, so that this lever is moved over an angle varying in size.

A particular feature and important function of this changeable lever system is to permit the heavy duty shutter to work precisely, even at slow exposure times and therefore slow shutter speeds (i.e., times under $\frac{1}{400}$ second) when the elasticity of the resilient member is not effective to permit attainment of the full aperture opening. The lever system in such cases is operable to deliver the full opening movement at low exposure times whereby the present invention results in a shutter mechanism in which it is for the first time possible to hold a constant effective aperture opening for speeds varying from under $\frac{1}{400}$ second through $\frac{1}{1600}$ second. As will be more readily appreciated from the description hereinafter set forth, this feature is attained by the novel innovation of structurally intercoupling variable control of both the effective power, i.e., the actuating spring strength, and the effective stroke of the actuating linkage, i.e., axial movement of the component connected parts.

The actuation of the sectors conveniently results by way of a bow-shaped member that is stressed upon the bending and stretching of its bow. Instead of this, it is also possible that the actuating system be resiliently mounted or that the mounting points of the sectors be resiliently arranged.

The transmission of the lever mechanism may be changed by a swingable arrangement of the entire actuating system. If the swinging is made possible up to an uncoupling, one can thereby avoid the opening of the sectors when tensioning the shutter. The same result can also be accomplished by means of a cover plate guided by the releaser.

A bulb-release of the shutter according to the invention is made possible in a simple manner by providing that the release lever in its position of rest prevents a blocking lever from falling into the path of a projection on the sector ring. In a similar manner one can very simply guide a switch for a flashlight current circuit.

For a more complete regulation of the exposure times the actuating force is conveniently split up into a main spring and a supplemental spring, whereby the latter is advantageously put into action and eventually regulated by the same member that effects the change in the width of opening of the sectors. By this arrangement it becomes possible to regulate the short exposure times without steps. In case the adjusting member is arranged in the plane of the sector ring, there results a very space-saving manner of construction, that is particularly suited for combination with lenses that are to be exchanged in their entireties.

My invention will now be described in greater detail with reference to the accompanying drawings illustrating the various embodiments thereof. In these drawings:

Fig. 1 shows an embodiment having a resilient push rod and an intermediate lever that is adjustably engaged with the sector ring;

Fig. 2 shows a similar embodiment wherein the resilient push rod is directly engaged with the sector ring without any intermediate lever;

Fig. 3 presents a driving scheme for the embodiment shown in Fig. 1;

Fig. 4 presents a driving scheme for the embodiment shown in Fig. 2;

Fig. 5 shows the release lever in combination with the locking lever;

Fig. 6 shows a resilient sector ring carrier, instead of the resilient push rod;

Fig. 7 shows a further embodiment wherein the axle of the tensioning lever and of the swinging plate is resiliently mounted, instead of the resilient push rod;

Fig. 8 shows a tensioning lever wherein the mounting point of the push rod is made resilient;

Fig. 9 shows a preferred arrangement of the sector ring and of the adjusting means for an embodiment using a replaceable lens;

Fig. 10 shows the arrangement of the flashlight switch;

Fig. 11 shows the manner of operation of the time lever and of the cover plate;

Fig. 12 shows a resilient mounting of the push rod upon the intermediate lever.

In the embodiments of Figs. 1 and 2, the adjustable swinging plate 1 and the actuating or tensioning lever 2 are mounted upon a common axle 3. In the embodiment of Fig. 1 the sector ring 4 is actuated by the lever 5 and the pin 6. The lever 5 is connected to the tensioning lever 2 by the push rod 7. The entire actuating mechanism has only one stop, namely the projection 8 for the tensioning lever 2.

In the embodiment of Fig. 2 the sector ring 4 is actuated by the pin 9 that is attached to the push rod 7 and passes through the slit 10 in the swinging plate 1. The push rod 7 is in both cases formed in a resilient manner (bow-shaped), in order to absorb the injurious thrusts that may arise. The blocking lever 11 serves to hold the tensioning lever 2 in its wound-up condition. The swinging plate 1 is adjustable. Thereby the transmission relationship to the sector ring 4 can be changed as desired, and thereby the sectors may be opened widely or less widely. The tensioning spring 12 is hooked into the swinging plate 1, and the latter can thereby be freely swung. A light spring 13 holds the swinging plate 1 inwardly.

Referring particularly to the embodiment of Fig. 1, if the tensioning lever 2 is tensioned in the direction of the arrow, then, first of all, the swinging plate 1 is swung outwardly (counterclockwise), because the spring 13 is weaker than the tensioning spring 12. The plate is swung to such an extent that the lever 5 comes out of engagement with the pin 6, and the plate then strikes against the projection 14. Only now will the tensioning lever 2 change its position with respect to the lever 5, and the latter may move without carrying with it the sector ring 4 and the sectors. The sector ring, therefore, remains in the closed position during tensioning and, for safety's sake, is held in this position by a light spring 16, which is attached to the swinging plate 1. This spring 16 holds the sector ring 4 tightly only during the tensioning movement. The spring 15 performs the same function in the embodiment of Fig. 2.

When the shutter is tensioned, then the tensioning lever 2 is held by the blocking lever 11, and the swinging plate 1 is swung inwardly by the spring 13. Thereby the lever 5 again comes into engagement with the pin 6. By means of a curve 17a on the adjusting ring 17 the depth of engagement is adjusted which governs the amount and path of tensioning of said tensioning lever 2, whereby the speed and extent of movement of the sector ring, hypothetically considering link 7 to be rigid instead of resilient, are simultaneously adjusted. The cam surface 17a varies this hypothetical extent of movement of the sector ring. Link 7, however, is resilient. At higher speeds it straightens out and snaps back which permits the momentum of the masses of the driven parts and the resiliency of the resilient link to provide full opening of the shutter mechanism upon reversal of motion of tensioning lever 2 from the shutter opening to the shutter closing direction. In the embodiment shown in Fig. 2 the procedure during tensioning is the same as in the embodiment of Fig. 1.

In case the stop 14 is positioned so far inwardly that the lever 5 cannot come out of engagement with the pin 6, then the sectors are opened during tensioning. In this case the opening must be covered by means of a cover plate 31, as shown in Fig. 11, in order to prevent an exposure. The cover plate 31 is controlled by the slit 31a and the pin 18a. The same also applies to the embodiment shown in Fig. 2.

The release lever 18 shown in Fig. 5 has a curve 19, such that the blocking lever 11 will uniformly release in all positions that can occur by the adjustment of the swinging plate 1. A supplemental spring 20 may be variably tensioned by a lever 21 that is guided by the curve 17b on the adjusting ring 17.

After the release, the actuating member 2 carries out a turning movement from the tensioned position to the projection 8, as shown in Figs. 1 and 2. Thereby in the embodiment of Fig. 2 it displaces by means of the push rod 7 the pin 9 that is guided in the slit 10 of the swinging plate 1 in a single backward and forward movement having a sinuous-formed path that corresponds to the path S in Fig. 4. The distance between the slit 10 and the middle point 4a of the sector ring 4 that is connected with the pin 9 by means of the slitted projection 4b, is changeable by adjustment of the position of the swinging plate 1. The sector ring 4 turns with a constant path S of the pin 9 through the angles alpha, beta and gamma of various sizes. The various positions of the pin 9, as shown in Fig. 2, are indicated by 9a, 9b, 9c, and 9a', 9b', 9c'. In the embodiment of Figs. 1 and 3 the lever 5 is displaced by means of the push rod 7 in a constant swinging movement about the angle $\psi$, whereby the pin 6 upon the sector ring, depending upon its distance from the turning point 5a of the lever 5, that is again fixed by the position of the swinging plate 1, is moved over paths a, b and c of various lengths. The positions 6a, 6b, 6c, and 6a', 6b', 6c' of the pin 6 will correspond to the amplitudes a, b, c.

By these arrangements it is made possible to limit the movement of the sectors, if desired without steps, to such an extent that the sectors only give free the full lens opening due to the stretching of the resilient member by means of the momentum of the parts that are moved, which substantially shortens the exposure time. If push rod 7 were hypothetically rigid instead of resilient, the extent of movement of the shutter sectors would shorten as their speed of movement increases. Push rod 7, however, is resilient. At higher speeds it reacts to the resultant increased momentum and straightens to permit the momentum of the masses of the driven parts and the resiliency of the resilient link to provide full opening of said shutter mechanism upon reversal of motion of the variable transmission lever mechanism including push rod 7 from the shutter opening to the shutter closing direction. Furthermore, there is afforded, particularly upon a uniform, gradual tensioning of the supplemental spring 20, a possibility of precise regulation, that goes far beyond the range of speed wherein a partial calling into play of the braking mechanism is still advisable.

In order to make the lens exchangeable, it is necessary to arrange the sectors as closely as possible to the rear lens. To accomplish this the adjusting ring 17 is arranged in the same plane as the sector ring 4, as shown in Fig. 9. Instead of using the resilient push rod 7, the sector ring carrier 22 with the sector holding pins 23 may be mounted rotatably and be made resilient in both directions by the springs 24 and 25 which in accordance with common practice are preferably carried by the usual base plate, as shown in Fig. 6. It will be obvious that springs 24, 25 are carried by a conventional link, arm, lever or the like, such as tensioning lever 2. In another alternative a spiral-shaped cut-out portion shown in Fig. 7 may serve as the carrier for the axle 3 of the tensioning lever 2 and the swinging plate 1, or for the mounting 5a of the lever 5. Furthermore, it is possible to have the connection between the push rod 7 and the lever 5 resilient, as shown in Fig. 12. Resiliency may also be afforded by the arrangement shown in Fig. 8, in which the push rod 7 is connected with the tensioning lever 2 by means of a resilient part 7a.

The flashlight switch 26 shown in Fig. 10 is brought into the reach of a pin 33 that is insulated by a bushing 35 and attached to the sector ring 4, by pressure upon the release lever 18, and can, therefore, only make contact, when the release lever 18 is depressed and the sectors open themselves. The angular form of the slit 34a in the lever 34 upon which the flashlight switch 26 is arranged has the effect that the lever 18, after the flashlight switch 26 has been brought into the operating position, can still move a bit without further changing the position of the lever 34. Only on this portion of its path does it release the shutter. The same is true of the slit in the cover 31 shown in Fig. 11.

In the case of time exposures the time lever 32 of Fig. 11 has a blocking action on the sector ring 4. The time lever 32 is controlled by the pin 18b on the release lever 18. The sectors can open themselves, but cannot then close so long as pressure is applied to the release lever 18.

It will be appreciated that the above-described examples are merely illustrative of the broad scope of the invention, particularly in that the several power transmission linkage systems described provide an actuating structure for operating shutter mechanisms in opening and reclosing movements with substantially no dwell period in between, except in cases where a blocking member is interposed for purposes of time exposures and the like, as in Fig. 11.

I claim:

1. A photographic lens shutter mechanism capable of operating at variable exposure time and including shutter members comprising: an operating member connected to said shutter members for moving said shutter members in shutter opening and shutter closing directions, a tensionable driving member pivoted for uni-directional movement during a shutter opening and reclosing operation, means for tensioning said driving member, adjustable transmission means connected with said driving member and said operating member for transmitting movement of said driving member to said operating member, said adjustable transmission means including a resilient link and structure for varying the extent of movement of said operating member in response to the movement of said driving member hypothetically considering said resilient link to be rigid, exposure time control means connected with said tensioning means and said adjustable transmission means for simultaneously varying the amount and path of tensioning of said driving member and said hypothetical extent of movement of said operating member, and said exposure time control means limiting said hypothetical extent of movement of said operating member to open said shutter members a predetermined amount less than their full opening which permits the momentum of the masses of the driven parts and the resiliency of said resilient link to provide said full opening of said shutter mechanism upon reversal of motion of said transmission means from said shutter opening to said shutter closing direction.

2. A photographic lens shutter mechanism of the type providing full aperture opening at all exposure speeds and comprising a backwardly and forwardly swingable shutter operating ring in combination with a variable tension power transmission system for operating said ring in shutter opening and closing directions, said system including adjustable means for varying the degree of opening movement of said ring in an unstressed state, said transmission system being inherently capable of resiliency in a stressed state produced by the inertia of said shutter during a shutter opening and closing movement, and said system further including control means for varying the exposure time of the mechanism by simultaneously increasing said tension power and diminishing the degree of unstressed opening movement to limit said degree of unstressed opening movement of said ring to open the shutter mechanism a predetermined amount less than its full opening which permits the momentum of the masses of the driven parts and the resiliency of said transmission system to provide full opening of said shutter mechanism upon reversal of motion of said transmission system from said shutter opening to said shutter closing direction.

3. A photographic shutter mechanism capable of operating at variable speeds from under 1/400 second up to about 1/1600 second comprising: a shutter operating means including a variable linkage system, said system being capable of controlling the extent of the opening movement and automatically initiating the closing movement of said shutter, said system including means for automatically initiating a shutter closing movement near the completion of a shutter opening movement but prior to the termination of said opening movement, elastic means in said system connected with said shutter for permitting said shutter to continue moving in a shutter opening direction under the effect of the inertia of said shutter during the initial portion of said automatically initiated closing movement to provide the desired degree of shutter opening, said variable linkage system including control means for adjusting the extent of opening movement of said shutter, time controlling means for governing the speed of movement of said shutter, and said control means being connected with said time controlling means for adjusting said extent of opening movement as an inverse function of said speed for actuating said means for automatically initiating said closing movement of said shutter at a time prior to said completion of a shutter opening movement which permits the momentum of the masses of the driven parts and the elasticity of said elastic means to provide full opening of said shutter mechanism upon reversal of motion of said variable linkage system from said shutter opening to the shutter closing direction.

4. A photographic lens shutter mechanism, capable of operating at variable exposure times from under 1/400 second to about 1/1600 second comprising a variable linkage system connected with said shutter mechanism for actuating the same in its shutter opening and shutter closing movements, said linkage system including control structure connected to a time setting ring for varying the effective power exerted upon the shutter mechanism while simultaneously varying the positively driven extent of movement of said shutter mechanism as an inverse function of said effective power, said system further including elastically deformable means physically interconnected and associated with said variable linkage system and normally operative to allow said shutter mechanism to move an additional extent under the effect of inertia after the initiation of a shutter closing movement by said variable linkage system at high exposure speeds, and said control structure limiting said positively driven extent of movement of said shutter mechanism to open said shutter mechanism a predetermined amount less than its full opening which permits the momentum of the masses of the driven parts and the elasticity of said elastically deformable means to provide full opening of said shutter mechanism upon reversal of motion of said variable linkage system from the shutter opening to the shutter closing direction.

5. A photographic camera shutter comprising a shutter actuating mechanism connected to said shutter, said mechanism being adapted to initiate the closing movement of said shutter in a positive manner, said mechanism including control means to adjust the speed of said shutter actuating mechanism, an elastically deformable means being part of a variable lever system, said variable lever system being operatively coupled to said mechanism and adapted to vary the time of initiation of closing movement and being connected with said control means, and said control means initiating said closing movement at earlier times as said speed is increased for varying said time of initiation of said closing movement of said shutter actuating mechanism a predetermined time before said shutter mechanism attains its full opening which permits the momentum of the masses of the driven parts and the elasticity of said elastically deformable means to provide full opening of said shutter mechanism upon reversal of motion of said variable lever system from the shutter opening to the shutter closing direction.

6. A photographic camera shutter having a plurality of shutter blades which move in one direction to open and in the opposite direction to close the shutter, said blades being arranged around a central hole giving the exact opening to be reached by the opening movement of said blades, a mechanism coupled to said shutter for positively driving said shutter in an opening and closing movement smaller than the one defined by a central hole, said mechanism comprising a resilient member adapted to be tensioned after said mechanism has initiated said closing movement and such tensioning allowing the completion of said exact opening, and control means operatively coupled to said mechanism for adjusting the speed of movement of said shutter and the extent of said opening movement as inverse functions of each other for limiting the extent of positively driven opening movement of said mechanism to open said shutter a predetermined amount less than its full opening which permits the momentum of the masses of the driven parts and the resiliency of said resilient member to provide full opening of said shutter upon reversal of motion of said mechanism from said shutter opening to said shutter closing direction.

7. A photographic camera shutter comprising blades, a blade ring for guiding said blades into their opening and closing movement, a variable lever system constituting a complete motion transmitting linkage between said blade ring and a spring driven crank, at least one resilient member included within said variable lever system for allowing said blade ring to move an additional extent under the effect of inertia during the motion reversing of said variable lever system, and blade ring movement speed adjusting means operatively coupled to said spring driven crank and to said variable lever system for adjusting the speed of movement and extent of movement before reversal of said motion transmitting linkage as inverse functions of each other for limiting said extent of opening movement of said motion transmitting linkage to cause said shutter to open a predetermined amount less than its full opening which permits the momentum of the masses of the driven parts and the resiliency of said resilient member to provide full opening of said shutter mechanism upon reversal of motion of said motion transmitting linkage from the shutter opening to the shutter closing direction.

8. A photographic camera shutter mechanism capable of operating at variable exposure speeds comprising a spring driven crank, a blade ring, a resilient member linking said crank with said blade ring, variable linkage means operatively coupling said resilient member to said blade ring and adapted to increase or decrease the unstressed stroke of said resilient member, variable tensioning means operatively coupled to said crank and adapted to increase or decrease the spring force of said crank, a cam ring, and both said variable means being operatively coupled to said cam ring whereby said spring force is increased when said stroke is decreased to shorten the total opening time of said shutter by limiting said unstressed stroke of said resilient member to open said shutter mechanism a predetermined amount less than its full opening which permits the momentum of the masses of the driven parts and the resiliency of said resilient member to provide full opening of said shutter mechanism.

9. A photographic lens shutter mechanism including freely swinging blades capable of operating at variable exposure times comprising a rotatable spring driven tensioning lever, a rotatable sector ring for guiding said freely swinging blades, said ring being arranged for pivoting in one direction to open and in the opposite direction to close said blades, shutter operating means connected with said rotatable sector ring for pivoting said blades in said opening and closing movements, a variable linkage system connected with said shutter operating means for controlling the extent of opening and closing movements of said ring, resilient means linking said driven tensioning lever with said linkage system, said resilient means being adapted to be stressed by an impulse of said spring driven tensioning lever, the elasticity of said resilient means after the motion reversing effected by said spring driven tensioning lever under the effect of inertia of the moving parts allowing said ring to complete the full opening of said shutter, and adjustable means in said variable linkage system for varying the speed of movement of said sector ring as an inverse function of the extent of movement of said linkage system before initiating said closing movement to hold substantially constant the effective aperture of said shutter over its range of exposure times.

References Cited in the file of this patent

UNITED STATES PATENTS

| | | |
|---|---|---|
| 382,858 | Bausch | May 15, 1888 |
| 436,404 | Dallmeyer et al. | Sept. 16, 1890 |
| 798,595 | Brueck | Sept. 5, 1905 |
| 1,391,790 | Ponton | Sept. 27, 1921 |
| 1,963,324 | Deckel et al. | June 19, 1934 |
| 2,522,699 | Willcox | Sept. 19, 1950 |

FOREIGN PATENTS

| | | |
|---|---|---|
| 7,176 | Great Britain | of 1888 |
| 245,466 | Germany | Apr. 9, 1912 |
| 568,181 | Germany | Jan. 16, 1933 |